(12) United States Patent
Kim et al.

(10) Patent No.: US 10,471,894 B2
(45) Date of Patent: Nov. 12, 2019

(54) METHOD AND APPARATUS FOR CONTROLLING VEHICULAR USER INTERFACE UNDER DRIVING CIRCUMSTANCE

(71) Applicants: Hyundai Motor Company, Seoul (KR); Kia Motors Corporation, Seoul (KR)

(72) Inventors: So Young Kim, Seoul (KR); Seung Ho Jeong, Seoul (KR); Ji Won Yun, Goyang-si (KR); Min Young Yoon, Seoul (KR); Chung Hoon Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/722,855

(22) Filed: Oct. 2, 2017

(65) Prior Publication Data
US 2018/0093611 A1 Apr. 5, 2018

(30) Foreign Application Priority Data
Oct. 5, 2016 (KR) .................. 10-2016-0128546

(51) Int. Cl.
| | |
|---|---|
| B60Q 9/00 | (2006.01) |
| G05D 1/02 | (2006.01) |
| B60K 35/00 | (2006.01) |
| B60R 1/00 | (2006.01) |
| B60K 37/06 | (2006.01) |

(Continued)

(52) U.S. Cl.
CPC ............... B60Q 9/00 (2013.01); B60K 35/00 (2013.01); B60K 37/06 (2013.01); B60R 1/00 (2013.01); G05D 1/021 (2013.01); B60K 2370/143 (2019.05); B60K 2370/16 (2019.05); B60K 2370/186 (2019.05); B60K 2370/195 (2019.05); B60K 2370/27 (2019.05); B60K 2370/334 (2019.05); B60K 2370/52 (2019.05); B60K 2370/77 (2019.05); B60R 2300/207 (2013.01); G02B 27/0101 (2013.01);
(Continued)

(58) Field of Classification Search
CPC .......... G02B 27/02; G02B 27/01; B60R 1/00; B60R 11/0229; B60R 2300/308; B60R 2300/70
USPC ........................................................ 340/438
See application file for complete search history.

(56) References Cited

U.S. PATENT DOCUMENTS

| | | |
|---|---|---|
| 6,654,070 B1 | 11/2003 | Rofe |
| 8,941,690 B2 | 1/2015 | Seder et al. |

(Continued)

FOREIGN PATENT DOCUMENTS

| | | |
|---|---|---|
| JP | 2011-6034 A | 1/2011 |
| KR | 10-1638860 B1 | 7/2016 |

*Primary Examiner* — Emily C Terrell
(74) *Attorney, Agent, or Firm* — Morgan, Lewis & Bockius LLP (57) ABSTRACT

A method for controlling an in-vehicle user interface includes monitoring a driving mode of a vehicle, determining, in response to the driving mode, whether to provide at least one window as an input/output module allowing a driver or a passenger to interact with at least one of a computing device, a camera, and a multimedia device provided in, or engaged with, the vehicle, and outputting a notification through the window in response to a determination result.

20 Claims, 6 Drawing Sheets

(51) Int. Cl.
*G02B 27/01* (2006.01)
*G06F 3/0481* (2013.01)
*G06F 3/0488* (2013.01)

(52) U.S. Cl.
CPC ............ *G02B 2027/014* (2013.01); *G02B 2027/0138* (2013.01); *G06F 3/0488* (2013.01); *G06F 3/04817* (2013.01)

(56) References Cited

U.S. PATENT DOCUMENTS

| | | | |
|---|---|---|---|
| 9,340,155 B2 | 5/2016 | Pisz et al. | |
| 2005/0231529 A1 | 10/2005 | Skwarek et al. | |
| 2014/0156133 A1* | 6/2014 | Cullinane | B60W 30/00 701/23 |
| 2015/0161836 A1* | 6/2015 | Park | G07C 9/00134 340/5.51 |
| 2015/0370140 A1 | 12/2015 | Bertolini | |
| 2016/0103569 A1 | 4/2016 | Zatalovski | |
| 2016/0104437 A1* | 4/2016 | Iwakawa | G02B 6/0011 345/690 |
| 2017/0137032 A1* | 5/2017 | Wuthnow | B60W 40/08 |
| 2018/0072229 A1* | 3/2018 | Mano | B60R 1/00 |
| 2018/0166047 A1* | 6/2018 | Yamazato | G09G 3/002 |
| 2018/0270542 A1* | 9/2018 | Ramalingam | B60R 1/00 |
| 2018/0283896 A1* | 10/2018 | Piemonte | G01C 21/3664 |

* cited by examiner

METHOD AND APPARATUS FOR CONTROLLING VEHICULAR USER INTERFACE UNDER DRIVING CIRCUMSTANCE

CROSS-REFERENCE TO RELATED APPLICATION

The present application claims priority to Korean Patent Application No. 10-2016-0128546, filed on Oct. 5, 2016, the entire contents of which is incorporated herein for all purposes by this reference.

BACKGROUND OF THE INVENTION

Field of the Invention

The disclosure relates to method and apparatus for controlling an in-vehicle user interface under a driving condition or a circumstance of a vehicle, and more particularly, to control method and apparatus for facilitating a driver or a passenger to use a vehicle window as a user interface of a computing device according to a driving condition or an environment of the vehicle.

Description of Related Art

Regarding vehicles, people have an interest in what they can do in space and time during their travel, beyond a simple mobility from here to there. However, user interfaces (e.g., keypad, screen, or etc.) that can be provided in a vehicle is spatially limited. Further, adding a complex user interface in the vehicle may impair a driving safety of a driver or a passenger (or an occupant).

A vehicle includes a window. Some or several windows mounted on the vehicle would be essential for a driver or a user to ensure visibility for the front, rear, and side views while the vehicle moves. If such a window could be used as a user interface, the convenience of the driver or the user can be enhanced.

Recently, a smart window technology has been suggested. For example, a driver or a user adjusts the amount of sunlight flowing through the windshield of the vehicle by a simple manipulation. Such a smart window technology uses a special film inserted in a car window to change the transparency of the car widow based on a received electrical control signal.

On the other hand, a vehicle windshield, which not merely secures a driver's view, but serves as a barrier to wind and rain, can include a 'smart window' function with cutting-edge electronic technology. For example, a head UP display (HUD) may be applied to an in-vehicle glass, which can achieve or add functions/characteristics such as an automatic lighting control, an ultra-light weight, and a touch screen.

The in-vehicle head-up display (HUD) is a technology that projects information or guidance, which is displayed on a conventional instrument panel such as a dashboard, on the eye level of the driver's window. This technique has been used to expand pilot's front view in a military combat plane. But, the head UP display (HUD) has been recently applied to vehicles so that the driver or user can obtain necessary information without having to look at the instrument panel or navigation device while driving. As a result, driver's or user's concentration while driving can be improved and driving safety can be enhanced. Recently, the head-up display (HUD) for a vehicle can engage with a front camera, a Global Positioning System (GPS), and various sensors so as to display plural information associated with driving.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method or an apparatus for controlling a vehicle window as an input/output module including a user interface for at least one of a computing device, a camera, and a multimedia device provided in, or engaged with, a vehicle according to a driving state/condition and a driving mode of the vehicle.

Further, the disclosure can provide a control device and a control method for indicating that a vehicle window for ensuring the visibility of a driver, a user, a passenger, or an occupant can be used as a transparent touch screen.

In addition, the disclosure can show a control method and a control method for automatically informing a driver, a user, a passenger, or an occupant of using a vehicle window as a transparent touch screen in response to a driving state/condition and a driving mode determined based on information collected by the vehicle including a plurality of sensors, an autonomous vehicle system, and etc.

Furthermore, the disclosure can provide a control device and a control method configured for capturing, editing, or processing information related to scenery or objects that a driver, a user, a passenger or an occupant can view through a vehicle window.

A method for controlling an in-vehicle user interface may include monitoring a driving mode of a vehicle; determining, in response to the driving mode, whether to provide at least one window as an input/output device allowing a driver or a passenger to interact with at least one of a computing device, a camera, and a multimedia device provided in, or engaged with, the vehicle; and outputting a notification through the window in response to a determination result.

The driving mode can be determined in accordance with at least one of a speed of the vehicle, an autonomous driving state, a driving road condition, and a predetermined condition predetermined by the driver or the passenger. The predetermined condition can be stored in the vehicle, and/or be received or updated through a telematics server with which the vehicle is engaged.

The window can be allowed to be used as the input/output device when the driving mode is an autonomous driving state.

The method can further include limiting the notification according to a position of the window.

The limiting the notification may include determining whether the window is next to driver's seat; allowing the notification when the window is not next to the driver's seat; allowing the notification when the vehicle is not moving and the window is next to the driver's seat; monitoring whether the driving mode is an autonomous driving state when the vehicle is moving and the window is next to the driver's seat; allowing the notification in the autonomous driving state when the window is next to the driver's seat; and limiting the notification when the window is next to the driver's seat and the driving mode is not the autonomous driving state.

The method can further include monitoring a battery charge state of the vehicle; and limiting the notification when the battery charging state falls within a predetermined range.

The notification includes at least one of a color and a pattern displayed on the window.

The notification can be outputted individually for each window mounted on the vehicle.

The method can further include receiving an input from the driver or the passenger at the window only through which the notification is outputted.

The input includes at least one of a touch input and a breath input.

The method can further include limiting the notification in response to a door open state and a window open state of the vehicle.

An apparatus is configured for controlling a window mounted on a vehicle, provided or engaged with at least one of a computing device, a camera, and a multimedia device. The apparatus may include a processing system that includes at least one data processor and at least one computer-readable memory storing a computer program. The processing system is configured to cause the apparatus to monitor a driving mode of a vehicle; determine, in response to the driving mode, whether to provide at least one window as an input/output device allowing a driver or a passenger to interact with at least one of a computing device, a camera, and a multimedia device; and output a notification through the window in response to a determination result.

An apparatus for controlling an in-vehicle user interface may include a driving mode monitoring device configured to monitor a driving mode of a vehicle; a determination device configured to determine, in response to the driving mode, whether to provide at least one window as an input/output device allowing a driver or a passenger to interact with at least one of a computing device, a camera, and a multimedia device provided in, or engaged with, the vehicle; and a notification device configured to output a notification through the window in response to a result delivered from the determination device.

The driving mode monitoring device can determine the driving mode based on at least one of a speed of the vehicle, an autonomous driving state, a driving road condition, and a predetermined condition predetermined by the driver or the passenger. The determination device can allow the window to be used as the input/output device when the driving mode is an autonomous driving state.

The apparatus can further include a control device for limiting the notification according to a position of the window. When the window is next to the driver's seat, the control device is configured to allow the notification when the vehicle is not moving; when the vehicle is moving, monitor whether the driving mode is an autonomous travelling state through the driving mode monitoring device; allow the notification in the autonomous driving state; and limit the notification when the driving mode is not in the autonomous driving state.

The apparatus can further include a battery management device configured to monitor a charge state of a battery in the vehicle. The notification device can limit the notification when the charging state of the battery falls within a predetermined range.

The notification includes at least one of a color and a pattern displayed on the window. The notification can be outputted individually for each window mounted on the vehicle.

The apparatus can further include a receiver for receiving an input from the driver or the passenger at the window only through which the notification is outputted. The input may include at least one of a touch input and a breath input.

The notification device limits the notification in response to a door open state and a window open state of the vehicle.

The apparatus can further include a communication device configured to: engage the at least one of the computing device, the camera, and the multimedia device with an audio-video-navigation device provided in the vehicle; or engage the at least one of the computing device, the camera, and the multimedia device with a mobile device coupled to a wireless communication device in the vehicle. The communication device can be coupled to the audio-video-navigation device via a controller area network (CAN), while the communication device can be coupled to mobile device through a short-range wireless communication method.

Advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure pointed out in the written description and claims hereof as well as the appended drawings.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the certain principles of the invention. The specific design features of the present invention as included herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terms "a" or "an", as used herein, are defined as one or more than one. The term "another", as used herein, is defined as at least one second or more. The terms "including" and/or "having" as used herein, are defined as including (i.e. open transition). The term "coupled" or "operatively coupled" as used herein, is defined as connected, although not necessarily directly, and not necessarily mechanically.

In the description of the invention, certain detailed explanations of related art are omitted when it is deemed that they may unnecessarily obscure the essence of the invention. The features of the invention will be more clearly understood from the accompanying drawings and may not be limited by the accompanying drawings. It is to be appreciated that all changes, equivalents, and substitutes that do not depart from the spirit and technical scope of the invention are encompassed in the invention.

Figure 1:
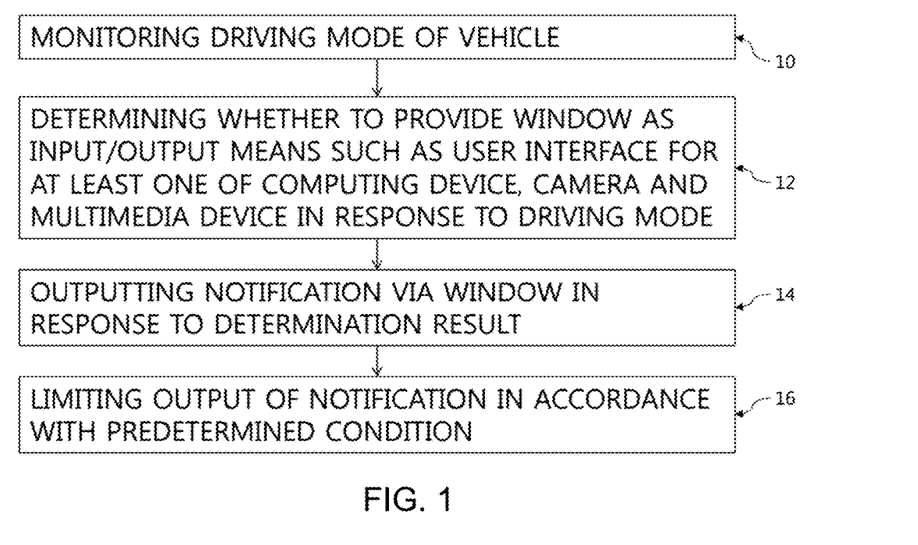
FIG. 1 shows a control method for an in-vehicle user interface.

FIG. 1 shows a control method for an in-vehicle user interface.

As shown, the control method for the in-vehicle user interface may include monitoring a driving mode of a vehicle (step 10), determining whether to provide the window as input/output device including a user interface for at least one of a computing device, a camera and a multimedia device in response to the driving mode (step 12), and outputting a notification via the window in response to a determination result (step 14). Herein, the driving mode may be determined in accordance with at least one of a vehicle speed, an autonomous driving state, a driving road, or conditions predetermined by a user or a driver. For the way of example but not limitation, the window can be provided as the input/output device when the driving mode of the vehicle is a fully autonomous driving state, which is distinguishable from a partially autonomous driving state or driver's operating state.

As an in-vehicle user interface, a window included in a vehicle to secure a view of a user, a driver, or a passenger can be provided as input/output device of at least one of a computing device, a camera, and a multimedia device. For this purpose, the vehicle can analyze various factors including a driving environment, a driving condition, or a driving state of the vehicle. When a driving safety would be not vitiated, the vehicle can determine providing a window of the vehicle to any one of the user, the driver, the passenger as an input/output device including a user interface. At the time, when the vehicle considers that a driving safety of the vehicle would be not vitiated even when vehicle window(s) is/are used as an input/output means, the vehicle can notify the user, the driver or the passenger that the window can be provided as the input/output device including a user interface.

The driving mode in which the vehicle window can be used as the input/output device may be determined based on a driving variable (e.g., a speed, a road conditions, etc.) of the vehicle or may be determined depending on whether the vehicle is in the autonomous driving state. On the other hand, the driving mode can be determined by value(s) or condition(s) set in advance by a user or a driver. Herein, the value(s) or condition(s) predetermined by the user or the driver may be stored in the vehicle. Also, the value(s)/condition(s) can be received from or updated by a telematics server which can be coupled with the vehicle through a wireless communication network.

Meanwhile, according to an embodiment, the driving mode of the vehicle may be initially set or determined by a manufacturer. Also, a user or a driver may adjust or change value(s) for determining the driving mode. However, the change of the user or the driver can be restricted. That is, user's change may not be allowed in a range of violating regulations of the area where the vehicle operates or harming the driving safety of the vehicle.

The control method for the in-vehicle user interface can further include limiting an output of the notification according to a predetermined condition (step 16). Although the window can be used as the input/output device according to the driving mode of the vehicle, it may be restricted due to conditions, environments, or the like, distinguishable from the driving mode, that the window is used as the input/output means. For the way of example but not limitation, when a driver uses a side window as an input/output device while operating a steering wheel, a driving safety may be vitiated. But, a driving safety may not be vitiated when a passenger sitting on the rear seat uses a side window as an input/output means. Further, in a case when a driver is operating the steering wheel, a passenger sitting on a front seat (front passenger seat) next to driver's seat may not use a side window of the passenger seat as the input/output device because the driver may glance at the side mirror.

On the other hand, an input/output device provided through window(s) of the vehicle may include a touch input device and a display or screen for at least one of a computing device, a camera, a multimedia device, and so on. To this end, the window(s) is/are not only made of conventional glass, but may include a (transparent) touch screen panel (TSP). Herein, the touch screen panel (TSP) is a sort of input device for recognizing a position of a screen or transmitting recognized position to a processor or a system when a user, a driver or a passenger presses or touches the screen with a finger or a pen. The touch screen panel (TSP) may include a touch panel, a control circuitry, a driver program including software, and the like.

A vehicle window can be a touch panel. The vehicle window may include top and bottom films/glasses deposited with a transparent electrode, e.g., Indium Tin Oxide (ITO). The vehicle window can recognize a position where a contact occurs or where a signal generates due to a change of capacitance, and transmit the position to a control circuitry. The control circuitry may convert an analog signal transmitted from the vehicle window into a digital signal so that the digital signal may be recognized in a coordinate form that may be displayed on the screen. The driver program may receive the digital signal delivered from the control circuit to resolve it in order that the touch panel may be utilized in accordance with an applicable apparatus or system.

A user, a driver or an occupant in the vehicle may want to do different things, but a vehicle may be designed to secure a driving safety. Therefore, although not shown, the control method for the in-vehicle user interface may further include deactivating a window nearby driver's seat when the vehicle is detected to be moving through a wheel speed sensor. The wheel speed sensor can recognize not only the speed of a wheel but also the movement of the wheel. Herein, the movement of the wheel can be equivalently considered the movement of the vehicle. In a moving vehicle, the driver, unlike the occupant including a passenger, may secure a driving safety so that the window nearby driver's seat may be forcibly deactivated when the vehicle moves or starts to move.

Figure 2:
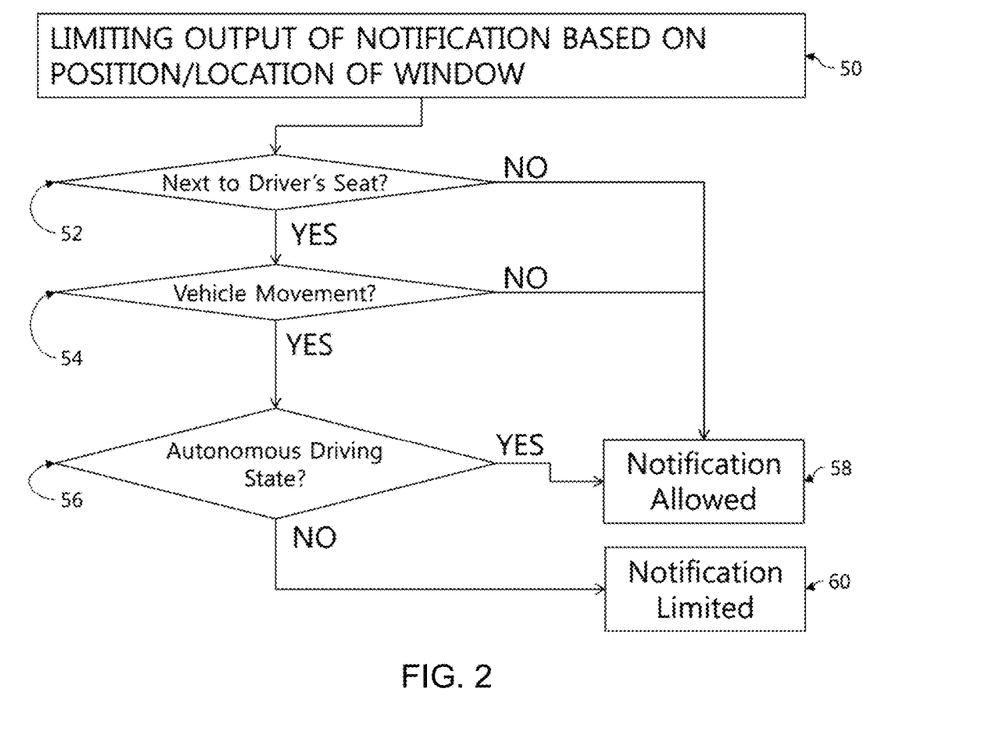
FIG. 2 describes a method for limiting a notification based on a position of a window.

FIG. 2 describes a method for limiting a notification based on a position/location of a window.

As shown, the control method for in-vehicle user interface may further include limiting an output of the notification based on a position/location of a window (step 50). The limiting the output of the notification (step 50) may include determining whether the window is next or adjacent to driver's seat (step 52). When the window is not next to the driver's seat, the notification can be allowed (step 58). When the window is next to the driver's seat, it may be checked whether the vehicle operates in an autonomous driving state (step 54). When the vehicle is not moving, the notification can be allowed (step 58). When the window is next to the driver's seat and the vehicle is moving, it can be monitored whether the driving mode is the autonomous driving state (step 56). When the window is next to the driver's seat, the notification can be allowed when the vehicle is in the autonomous driving mode. When the window is next to the driver's seat and the moving vehicle is not in the autonomous driving state, the notification can be restricted or limited (step 60).

According to an embodiment, when the notification that a vehicle window can be used as an input/output device is limited, a user, a driver or a passenger cannot use the vehicle window as the input/output means. Although not shown, the control method for in-vehicle user interface may further include receiving user's or driver's input via a window only in which the notification is outputted. Herein, user's or driver's input may include at least one of a touch input and a breath input.

Figure 3:
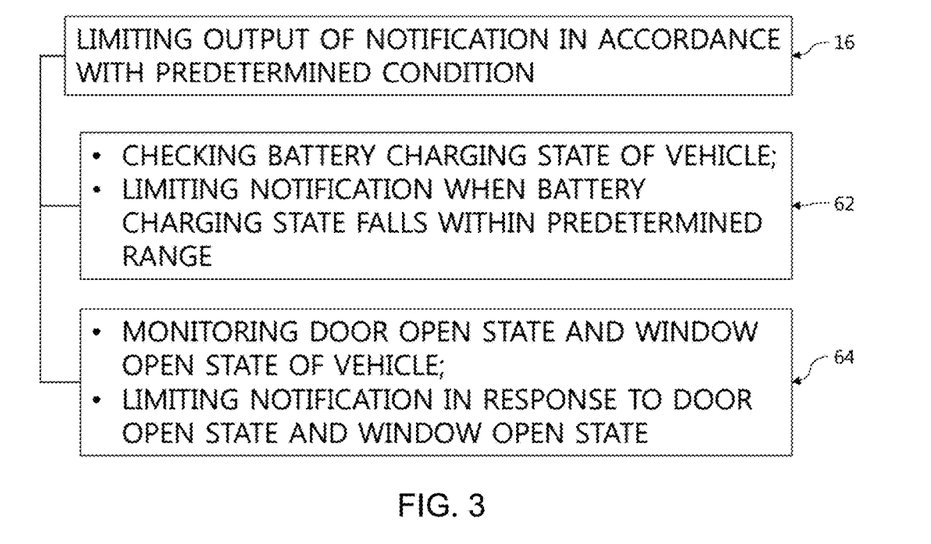
FIG. 3 shows a method for restricting a notification.

FIG. 3 shows a method for restricting a notification.

As shown, the control method for the in-vehicle user interface may include limiting the output of the notification in accordance with a predetermined condition (step 16).

To limit the output of the notification, the control method for the in-vehicle user interface may include checking a battery charging state of a vehicle (step 62), and limiting the notification when the battery charging state falls within a predetermined range (step 62). In a case of an electric vehicle or a hybrid vehicle using an electrical energy stored in the vehicle as a power source, the electrical energy stored in the vehicle may be necessarily or preferentially used to improve a driving performance. Therefore, when the battery charging state of the vehicle is below a predetermined range or level, a user, a driver or a passenger may not use the window or the like of the vehicle as an input/output means.

Meanwhile, the control method for the in-vehicle user interface may further include monitoring a door open state and a window open state of the vehicle, and limiting the notification in response to the door open state and the window open state (step 64). For the way of example but not limitation, when a vehicle window is open while the vehicle operates, the vehicle window may not be suitable for use as an input/output means. Further, when a door is opened in a state where the vehicle is stopped while operating, a window of the opened door may not be suitable for use as an input/output means.

Figure 4:
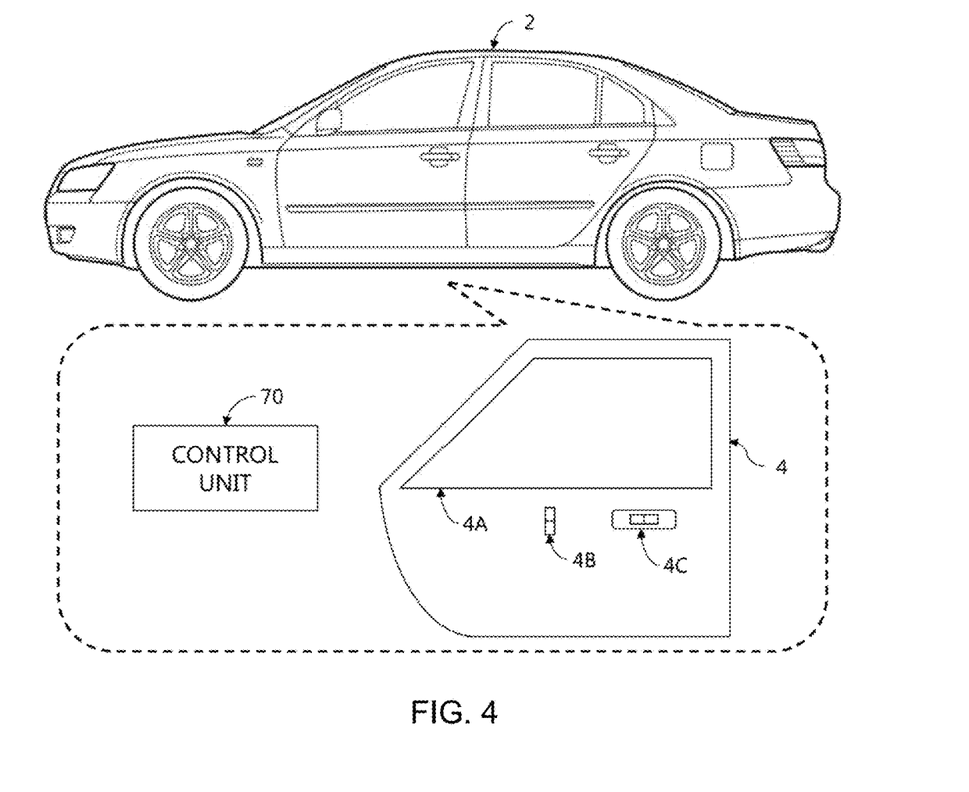
FIG. 4 shows a vehicle including vehicle window(s) used as a user interface.

FIG. 4 shows a vehicle including vehicle window(s) used as a user interface.

As shown, the vehicle 2 includes at least one door 4. The door 4 may include a window 4A, a door opening device 4C, and a window opening device 4B. Herein, the window 4A securing view(s) of a user, a driver, a passenger or an occupant via a glass may include a touch screen panel (TSP). The vehicle 2 may include a control device 70 that can monitor and control a driving state of the vehicle. The control device 70 may be coupled with various sensors, operating devices, and auxiliary devices mounted on, or provided in, the vehicle so that the control device 70 can transmit to, and receive from, the plural data in real time while the vehicle is moving.

An in-vehicle user interface can provide environment to a user, a driver, a passenger or an occupant, as a device for performing operations (e.g., recording, manipulation, web search, and data-sharing) on window(s) provided in the vehicle 2. The in-vehicle user interface may be intuitive and convenient because the user, the driver, the passenger or the occupant can use a transparent touch screen included in the window 4A. Since anyone in the vehicle 2 can operate an audio-video-navigation device (AVN) or an in-vehicle electronic mounted on the vehicle 2 through a transparent touch screen included in the window 4A, it is possible to provide some convenient functions to all seats in the vehicle.

As not shown, an atmospheric pressure sensor that detects user's, driver's, or the passenger's breathing may be located on a peripheral edge portion of the window 4A provided in the vehicle 2. Further, according to the embodiment, a camera may be located in an internal space (inside the vehicle 2) or on a window frame from the window 4A. A barometer may be used as the atmospheric pressure sensor to recognize user's, driver's or passengers' breathing at a low cost.

For the way of example but not limitation, the barometer can recognize the air pressure change when an occupant blows her breath on the window 4 A of the vehicle 2. The window 4A sometimes condensational may be activated as a screen in response to a signal generated from recognized air pressure change. Thereafter, user's touch on the window 4A can be inputted through a touch panel operated in an electrostatic manner. In addition, after the transparent touch screen of the window is activated and the user sketches on the touch panel, the user blows her breath on the window 4A. When the barometer detects her breath, contents sketched on the touch panel, i.e., the window 4A, may be stored and a new input window can be activated. At the time, stored contents can be transmitted to a device including a portable terminal or the like engaged with the vehicle 2 through a short-range wireless communication technology (e.g., Wi-Fi, Bluetooth, etc.).

As not shown, what a user, a driver or a passenger in the vehicle 2 can do by use of the window 4A as an input/output device may vary widely. In the instant case, the control method for the in-vehicle user interface may include providing a first touch input button for selecting at least one of a computing device, a camera, and a multimedia device on a window in response to a change of atmospheric pressure; and providing a second touch input button for controlling at least selected one among the computing device, the camera, and the multimedia device on the corresponding window. For the way of example but not limitation, the first touch input button may include a menu/button for selecting a device desired to be used by a user, a driver or a passenger, while the second touch input button may include a menu/button for controlling or operating the selected device.

Further, when there is some limitation of a device which a user, a driver or an occupant can use via a window of the vehicle including an input/output means, for example, when the window may be designed to be used only for a specific program, an application or a specific device provided in the vehicle, either the first touch input button or the second touch input button can be provided. When an application or an apparatus supports functions or services responsive to a complicated input, the first touch input button or the second touch input button may be provided as an upper or lower level menu/button.

As not shown, the control method for the in-vehicle user interface may include at least one of engaging at least one of a computing device, a camera, and a multimedia device using a window as an input/output device with an audio-video-navigation device provided in the vehicle, and engaging at least one of the computing device, the camera, and the multimedia device with a portable or mobile device coupled with an in-vehicle wireless communication terminal. Regarding extendibility, computing devices mounted on a vehicle at the time of manufacture of a vehicle may have limitation. However, when interworking or engaging with an external device through a wired/wireless communication terminal mounted on a vehicle, the extendibility of the computing devices can be enhanced. For the way of example but not limitation, when a mobile device and a window are mirrored each other, a user, a driver or a passenger can use the window as an input/output device instead of user interfaces of the mobile device, and can use or control various programs or applications supported by the mobile device through the window.

Figure 5A:
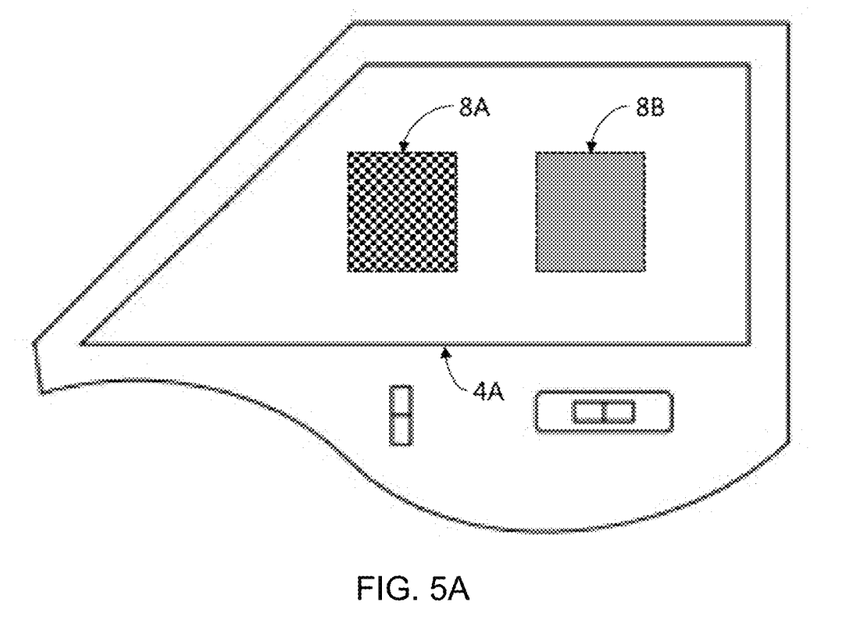
FIG. 5A and FIG. 5B describe a notification on a window mounted in a vehicle.
Figure 5B:
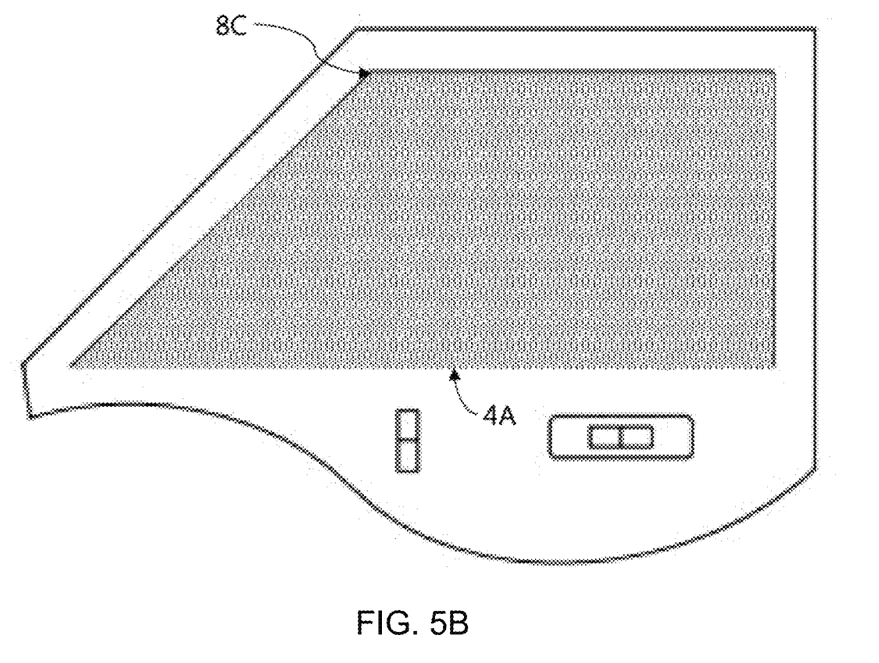

FIG. 5A and FIG. 5B describe a notification on a window mounted in a vehicle. FIG. 5A shows a case where the notification is displayed on a partial area of the window, while FIG. 5B shows a case where the notification is displayed on the entire window.

As shown, when it is determined that the window 4A mounted on the vehicle is allowable as an input/output means, the vehicle can output notification(s) 8A, 8B, 8C. Herein, the notification 8A, 8B, 8C may include at least one of a color and a pattern which can be displayed on the window 4A. Further, the notification 8C may include a color or a pattern displayed on the entire area of the window 4A. According to an embodiment, the notification 8A or 8B may include a color or a pattern on a partial area only where a user, a driver or an occupant can perceive it sufficiently. Also, depending on an embodiment, the color or pattern may vary, and may continue to be displayed for a predetermined time or may flicker for a predetermined time.

On the other hand, the notification 8A, 8B, 8C can be individually outputted on each window mounted on the vehicle. For the way of example but not limitation, the notification 8A, 8B, 8C may be shown on windows nearby driver's seat, front passenger's seat, and rear seats. The notification 8A, 8B, 8C may be shown on a window next to passenger's seat only.

Figure 6:
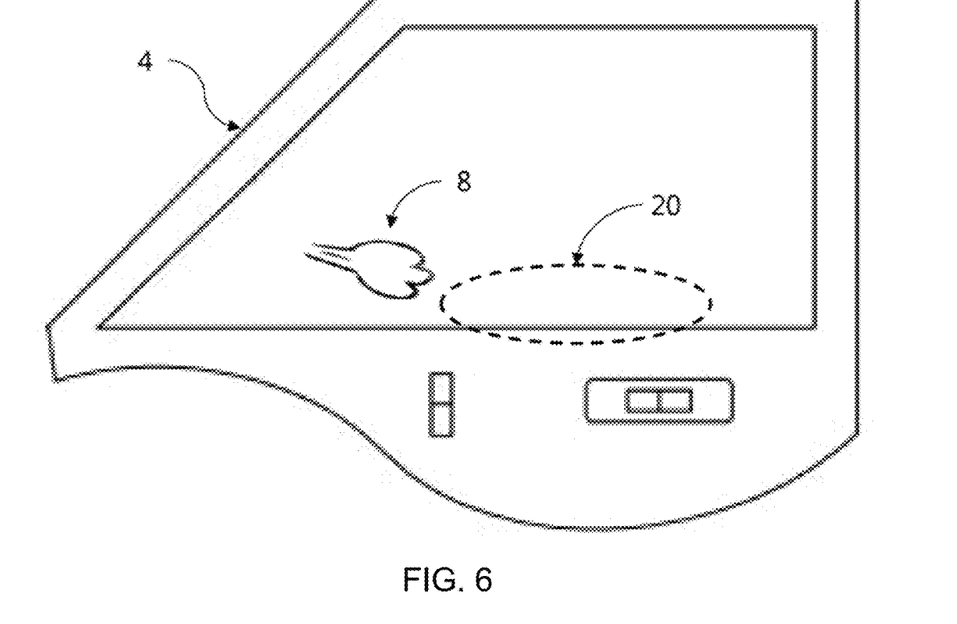
FIG. 6 shows an operation of an air pressure sensor.

FIG. 6 shows an operation of an air pressure sensor.

As shown, when an air pressure sensor may be disposed in the vicinity of the window 4A included in the door 4 of the vehicle, the air pressure sensor can recognize whether a user, a driver or an occupant blows a breath 8 in a detecting range 20 of the air pressure sensor.

Herein, the detecting range 20 of the air pressure sensor may vary depending on the position of the air pressure sensor. However, it is possible to increase the convenience of a user, a driver, or a passenger when the air pressure sensor would be located at an area where the user, the driver or the passenger can blow a breath comfortably in a state where the user, the driver or the occupant may sit in a seat.

According to an embodiment, to increase user's, driver's or occupant's intuitiveness regarding the detecting range 20 for her breath 8, the air pressure sensor may be disposed not far away from various control buttons (e.g., a window opening button, a door opening button) that may be included in the door 4.

Figure 7:
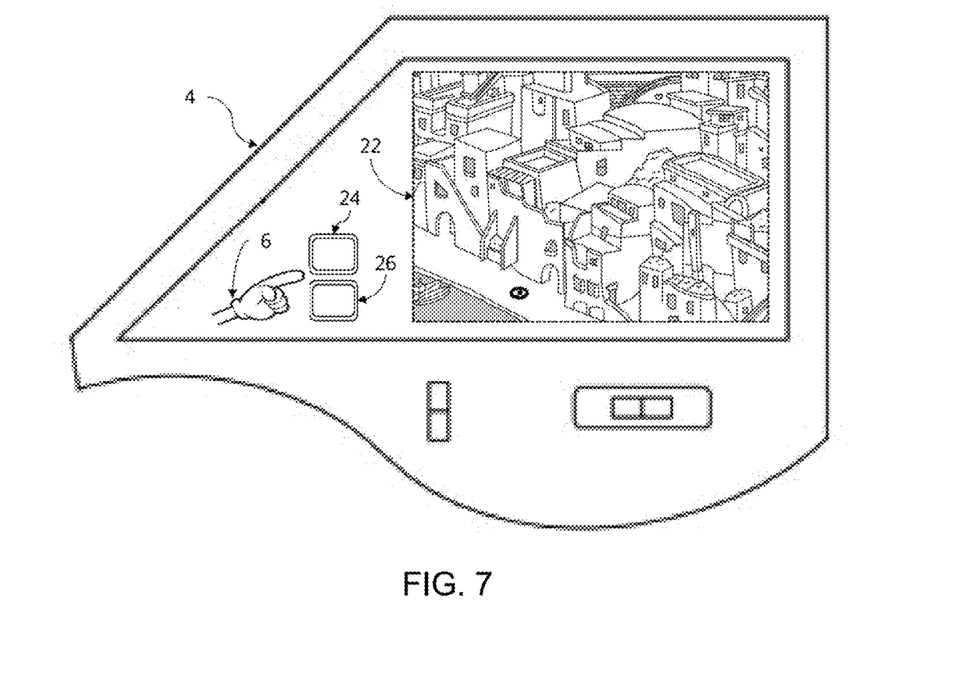
FIG. 7 illustrates a first example of an in-vehicle user interface.

FIG. 7 illustrates a first example of an in-vehicle user interface. In the first example, a window in a vehicle door 4 is used as a user interface system for a multimedia device (e.g., an audio-video-navigation device mounted on a vehicle, a computing device or a multimedia device possessed by a user, a driver, or an occupant, etc.) provided in or engaged with a vehicle.

As shown, a transparent touch screen included in the window may include a display area 22, touch input buttons 24, 26, and the like. The size and position of the display area 22 and the touch input buttons 24, 26 may be changed. The display area 22 and the touch input buttons 24, 26 may be overlapped on each other on the screen. The touch input button 24, 26 may include a button or two or more buttons and may deliver a touch input of a user, a driver or a passenger (e.g., touch by user's finger 6).

Figure 8:
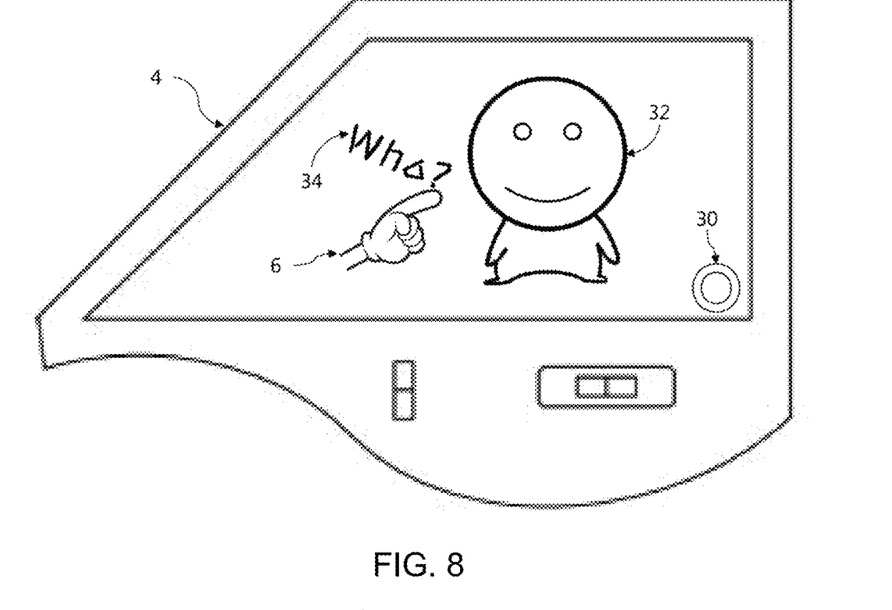
FIG. 8 illustrates a second example of the in-vehicle user interface.

FIG. 8 illustrates a second example of the in-vehicle user interface. In the first example, a window in a vehicle door 4 is used as a user interface system for a multimedia device (e.g., an audio-video-navigation device mounted on a vehicle, a computing device or a multimedia device possessed by a user, a driver, or an occupant, etc.) provided in or engaged with a vehicle.

As shown, a computing device in cooperation with a transparent touch screen used as a user interface and included in a window of a vehicle can provide an application creating and editing a picture 32, a text 34, a memo, etc. through touch input(s) of a user, a driver or a passenger (e.g., touch by user's finger 6). The window of the vehicle can be used as an input/output device for recognizing the touch of the user, the driver or the passenger (e.g., touch by user's finger 6) and displaying inputted contents. The window can recognize information delivered through a touch input button 30. At the time, data or contents created, recorded and stored through the window of the vehicle can be transmitted to and stored in a computing device provided in the vehicle or a mobile device, a computing device, and the like engaged with the vehicle.

Figure 9:
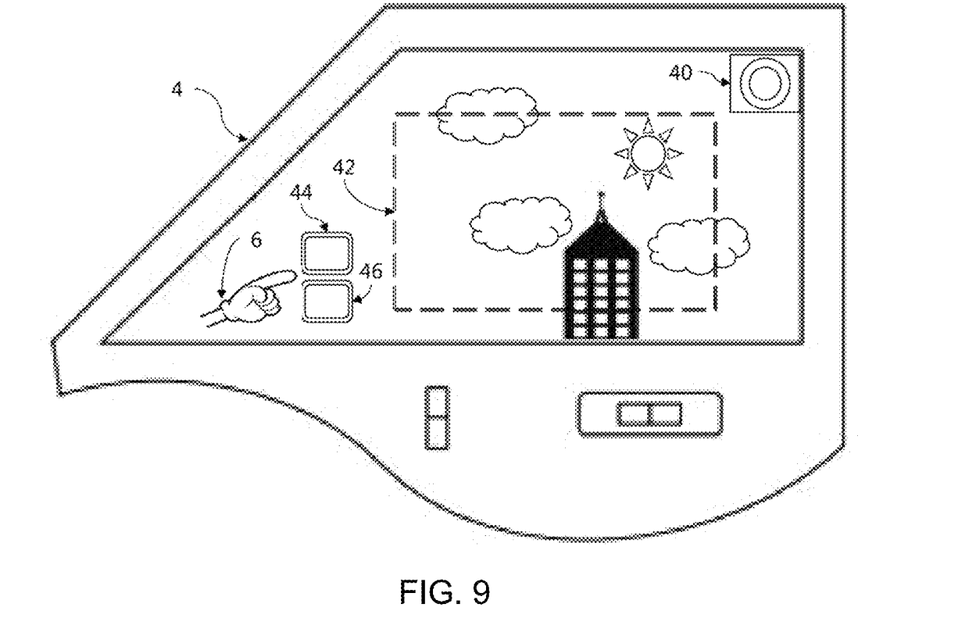
FIG. 9 illustrates a third example of the in-vehicle user interface.

FIG. 9 illustrates a third example of the in-vehicle user interface. The third example in the case where a window in the door 4 of the vehicle is used as a user interface system for a camera apparatus 40 will be described.

As shown, a transparent touch screen included in the window may include a frame (i.e., a display area 42 capable of serving as a viewfinder of the camera apparatus 40), which displays a photographing area of a landscape or an object seen through a window, and a shutter touch button 44 for controlling a capture of the photographing area. Further, the transparent touch screen included in the window may further include an edit button 46 for facilitating editing of photographed image. Herein, the shutter touch button 44 and the edit button 46 are merely the way of examples, and may vary depending on functions that can be provided through a transparent touch screen in a camera module, an application, or a computing device to be interlocked.

A user, a driver or a passenger can view outside scenery, objects, etc. through the window in the vehicle, and can activate the transparent touch screen of the window to capture or photograph scenery, objects, etc. in the frame 42. For the way of example but not limitation, the size, position, etc. of the frame 42 may be fixed based on the position and view direction of the camera apparatus 40. Also, according to an embodiment, the size, the position, and the like of the frame 42 can be adjusted, and the camera apparatus 40 can change a zoom function, a direction and an angle of lens, and the like in response to adjusted characteristics of the frame 42.

Herein, the camera apparatus 40 may be located inside the window or in a window frame. Further, disposed within a spatial range without inconvenience of a user, a driver or an occupant inside the vehicle, the camera apparatus 40 may be detachable.

Further, it is possible to edit a photograph, including a landscape, an object, and the like, captured by the camera apparatus 40 through the edit button 46 or the like on a transparent touch screen included in a window. Via the window, color(s), shape(s), etc. included in the photograph may be spoiled or stored. Further, spoiled color(s), shape(s), etc. may be used in another picture, sketch, and the like through touch input(s) of a user, a driver, or an occupant (e.g., touch(es) by user's finger 6).

Figure 10:
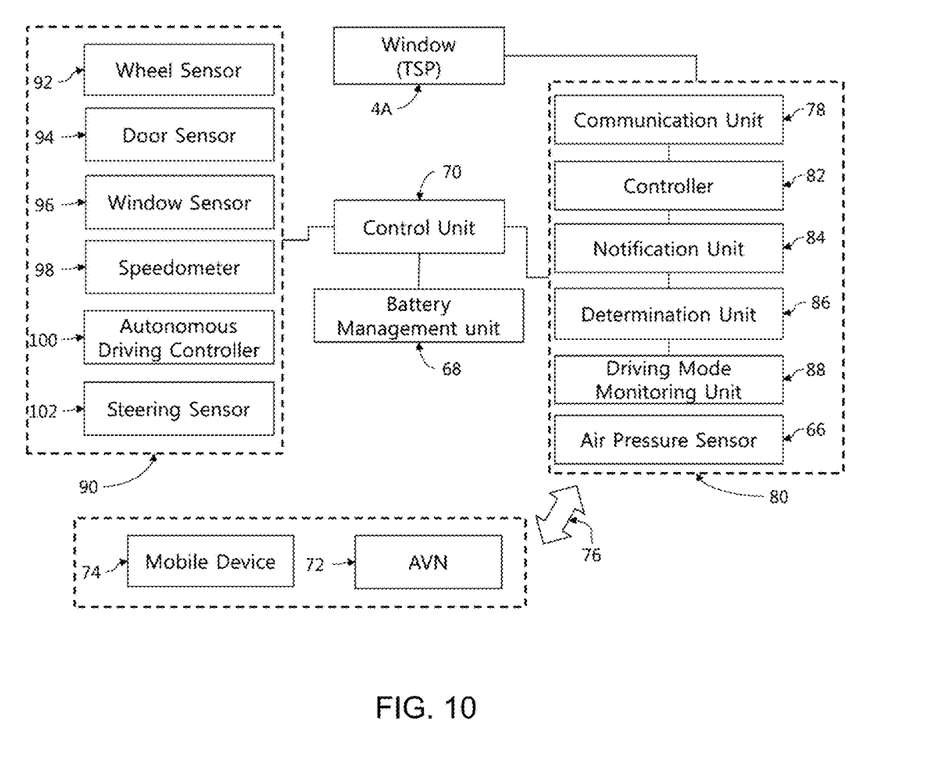
FIG. 10 shows a control apparatus for an in-vehicle user interface.

FIG. 10 shows a control apparatus for an in-vehicle user interface.

As shown, an in-vehicle user interface control apparatus 80 can be coupled to at least one of a mobile device 74 possessed by a user, a driver or an occupant, and an audio-video-navigation device (AVN) 72 provided in a vehicle, via a wired/wireless communication technology 76. For the way of example but not limitation, a communication device 78 in the in-vehicle user interface control apparatus 80 may be coupled with the audio-video-navigation apparatus 72 through a Controller Area Network (CAN), while the mobile device 74 may be coupled with the communication device 78 via a short-range wireless communication method.

An applicable short-range communication method may include at least one of Bluetooth, Bluetooth Low Energy, Zigbee, Ultra Wide Band (UWB), millimeter wave (mm-Wave), and the like.

The in-vehicle user interface control device 80 may include a processing system that includes at least one data processor and at least one computer-readable memory storing a computer program. According to an embodiment, the in-vehicle user interface control device 80 may be implemented in a single circuitry chip or board.

The in-vehicle user interface control device 80 can be provided with a driving mode monitoring device 88 configured to monitor a driving mode of the vehicle, a determination device 86 configured to determine, in response to the driving mode, whether a window 4A is provided as an input/output device for at least one of a computing device, a camera, and a multimedia device, and a notification device 84 configured to output a notification through the window 4A in response to a determination result of the determination device 86.

Herein, the driving mode monitoring device 88 may receive information regarding at least one of a speed of the vehicle, an autonomous driving state, a road condition, and conditions predetermined by a user or a driver from the control device 70. Based on the information delivered from the control device 70, the driving mode monitoring device 88 can determine whether the vehicle currently operates in a driving state in which the window 4A may be used as an input/output means.

The control device 70 can be coupled with various driving devices 90 provided in the vehicle. The driving device 90 may include a wheel sensor 92 configured to detect a movement of wheel(s), a door sensor 94 configured to detect a door opening state, a window sensor 96 configured to detect a window opening state, a speedometer 98 configured to monitor a speed of the vehicle, an autonomous driving controller 100 configured to provide an autonomous driving state without driver's operation, a steering sensor 102 configured to detect whether the driver operates a steering wheel, and the like. The driving device 90 may be various from the plurality of sensors or devices shown in the drawing, and may transmit driving state/data of the vehicle to the control device 70 in real-time. The control device 70 can monitor and control information transmitted from the driving device 90. For the way of example but not limitation, information related to the door open state and the window open state of the vehicle can be transmitted from the door sensor 94 and the window sensor 96 to the control device 70. The controller 82 receiving information from the control device 70 may limit or restrict the notification outputted from a notification device 84 in response to the door open state and the window open state. In addition, when a wheel sensor 92 for detecting the movement of the wheels included in the driving device 90 of the vehicle can detect the movement of the vehicle, the movement of the vehicle is delivered to the controller 82 though the control device 70, and the controller 82 may limit the notification outputted at the window located in driver's seat.

When the driving mode is determined by the driving mode monitoring device 88, the determination device 86 can determine whether the window 4A may be provided as an input/output means. For the way of example but not limitation, the determination device 86 may provide the window 4A as the input/output device when the driving mode is in an autonomous driving state.

According to the embodiment, the driving mode monitoring device 88 can determine the driving mode based on condition(s) predetermined by a user or a driver. At the time, the conditions predetermined by the user or the driver may be stored in the vehicle, and/or may be received or updated through a telematics server to which the vehicle is coupled with via a wireless communication network.

The in-vehicle user interface control device 80 may include the controller 82 configured to limit the output of the notification transmitted from the notification device 84 based on the position of the window 4A. For the way of example but not limitation, when the window 4A is next to driver's seat, the controller 82 may allow the notification when the vehicle does not move. When the vehicle moves, the controller 82 can monitor whether the driving mode is in the autonomous driving state through the driving mode monitoring device 88. When the vehicle is in the autonomous driving state, the controller 82 can allow the notification on the window 4A nearby driver's seat and limit or restrict the notification when the vehicle does not operate in the autonomous driving state. According to an embodiment, a window next to driver's seat and another window next to a front passenger seat may be controlled equivalently or differently.

In a vehicle storing an electrical energy, a battery management device 68 can be engaged with the in-vehicle user interface control device 80 through the control device 70. Further, according to an embodiment, the in-vehicle user interface control device 80 may further include a battery management device configured to monitor a state of charge (SOC) of the battery mounted inside the vehicle. The controller 82 can receive the state of charge (SOC) of the battery from the battery management device 68 and limit or restrict the notification when the state of charge (SOC) of the battery is lower than a predetermined range or level.

The notification outputted from the notification device 84 may include at least one of a color and a pattern displayed on the window 4A. Further, the notifications can be individually or separately outputted on each window 4A mounted on the vehicle.

As not shown, to control a transparent touch screen panel (TSP) included in the window 4A, the in-vehicle user interface control device 80 can be provided with a receiving device configured to receive an input from a user or a driver in a window only on which the notification is outputted, and a display device configured to transmit information displayed. The input/output device included in the window 4A of the vehicle may include a touch input device and a display or screen suitable for at least one of a computing device, a camera, and a multimedia device.

An air pressure sensor 66 included in the in-vehicle user interface control device 80 can detect whether a user blows a breath. The controller 82 can activate the touch input device and the display or the screen included in the window 4A in response to the change of an air pressure detected by and delivered from the air pressure sensor 66. In addition, the controller 82 may deactivate the touch input device, the display, or the screen when there is no input from a user, a driver, or a passenger during a predetermined time after the touch input device and the display or the screen are activated. Further, the controller 82 in the in-vehicle user interface control device 80 may generate a signal for resetting the touch input device and the display or the screen displayed on the screen in response to the change of air pressure. As above described, the input from the user, the driver, or the passenger may include at least one of a touch input and a breath input.

In addition, the in-vehicle user interface control device 80 may be configured to engage at least one of the computing device, the camera, and the multimedia device with an audio-video-navigation device mounted in the vehicle. Or, the in-vehicle user interface control device 80 may include a communication device 78 configured to engage at least one of the computing device, the camera, and the multimedia device with a mobile device 74 coupled with a wireless communication terminal provided in the vehicle.

The air pressure sensor 66 included in the in-vehicle user interface control device 80 can be engaged with the driving device 90. Based on the information transmitted from the door sensor 94 configured to detect whether the door mounted on the vehicle is opened and the window sensor 96 configured to detect whether the window is opened, which included in the driving device 90, the controller 82 may activate the air pressure sensor 64 only when the door sensor 94 informs that the door is closed and the window sensor 96 informs that the window 4A is closed. This is because a malfunction of the air pressure sensor 64 may be prevented and a power consumption may be reduced. When the window 4A is open, the air pressure sensor 66 adjacent to opened window 4A can be deactivated.

As above described, disclosed exemplary embodiments can provide a control device and a control method for notifying a driver, a user, a passenger or an occupant that a vehicle window can be used as a user interface for a computing device, a camera, or a multimedia system, provided in or engaged with the vehicle, in response to driving condition/state of the vehicle.

Further, without any manipulation of the driver, the user, the passenger or the occupant of the vehicle, described embodiments can inform the driver, the user, the passenger or the occupant that the vehicle window would be available for user's interface, so that the convenience of people in the vehicle can be enhanced.

Furthermore, disclosed exemplary embodiments can provide that a vehicle determines by itself whether the driver, the user, the passenger or the occupant uses the vehicle window as user's interface under a driving condition or environment so that the vehicle window (or other computing devices associated with the vehicle window) does not respond to an input error of the driver, the user, the passenger or the occupant as well as their conducts threating driving safety. Thus, driving safety can be improved.

The aforementioned embodiments are achieved by invention in a predetermined manner. Each of the structural combination of structural elements and features of the elements or features can be considered selectively unless specified separately. Each of the structural elements or features may be conducted without being combined with other structural elements or features. Also, some structural elements and/or features may be combined with a another to form the embodiments of the invention. The order of operations described in the exemplary embodiments of the invention may be changed. Some structural elements or features of an exemplary embodiment may be included in another exemplary embodiment, or may be replaced with corresponding structural elements or features of another exemplary embodiment. Moreover, it will be apparent that some claims referring to specific claims may be combined with other claims referring to the other claims other than the specific claims to form the embodiment or add new claims by amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. When desired, the machine-readable medium may be realized in a form of a carrier wave (for example, a transmission over the Internet).

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling an in-vehicle user interface, the method comprising:
   monitoring a driving mode of a vehicle;
   determining, in response to the driving mode, whether to provide at least one window as an input/output module allowing a driver or a passenger to interact with at least one of a computing device, a camera, and a multimedia device provided in, or engaged with, the vehicle; and outputting a notification through the window in response to a determination result, wherein when a first condition for moving the vehicle and a second condition for detecting the driving mode except an autonomous driving state are satisfied, all windows except a window next to a driver's seat are activated, when the window is opened, the window corresponding to open state is inactivated, and when a battery charging state is below a predetermined range or level, all windows are inactivated.

2. The method according to claim 1, wherein the driving mode is determined in accordance with at least one of a speed of the vehicle, the autonomous driving state, a driving road condition, and a predetermined condition preset by the driver or the passenger, and wherein the predetermined condition is stored in the vehicle, and is received or updated through a telematics server with which the vehicle is engaged.

3. The method according to claim 2, wherein the window is allowed to be used as the input/output module when the driving mode is the autonomous driving state.

4. The method according to claim 1, further including:

limiting the notification according to a position of the window.

5. The method according to claim 4, wherein the limiting the notification including:

determining whether the window is adjacent to the driver's seat;

allowing the notification when the window is not adjacent to the driver's seat;

allowing the notification when the vehicle is not moving and the window is adjacent to the driver's seat;

monitoring whether the driving mode is the autonomous driving state when the vehicle is moving and the window is adjacent to the driver's seat;

allowing the notification in the autonomous driving state when the window is adjacent to the driver's seat; and limiting the notification when the window is adjacent to the driver's seat and the driving mode is not the autonomous driving state.

6. The method according to claim 1, further including:

monitoring the battery charge state of the vehicle; and limiting the notification when the battery charging state falls within a predetermined range.

7. The method according to claim 1, wherein the notification includes at least one of a color and a pattern displayed on the window.

8. The method according to claim 1, wherein the notification is outputted respectively for each window mounted on the vehicle.

9. The method according to claim 1, further including:

receiving an input from the driver or the passenger at the window only through which the notification is outputted.

10. The method according to claim 9, wherein the input includes at least one of a touch input and a breath input.

11. The method according to claim 1, further including:

limiting the notification in response to a door open state and a window open state of the vehicle.

12. An apparatus for controlling a window mounted on a vehicle, provided or engaged with at least one of a computing device, a camera, and a multimedia device, including a processing system that includes at least one data processor and at least one computer-readable memory storing a computer program, wherein the processing system is configured to cause the apparatus to:

monitor a driving mode of the vehicle;

determine, in response to the driving mode, whether to provide at least one window as an input/output module allowing a driver or a passenger to interact with at least one of the computing device, the camera, and the multimedia device; and output a notification through the at least one window in response to a determination result, wherein when a first condition for moving the vehicle and a second condition for detecting the driving mode except an autonomous driving state are satisfied all windows except a window next to a driver's seat are activated, when the window is opened, the window corresponding to open state is inactivate, and when a battery charging state is below a predetermined range or level, all windows are inactivated.

13. An apparatus for controlling an in-vehicle user interface, the apparatus comprising:

a driving mode monitoring unit configured to monitor a driving mode of a vehicle;

a determination unit configured to determine, in response to the driving mode, whether to provide at least one window as an input/output module allowing a driver or a passenger to interact with at least one of a computing device, a camera, and a multimedia device provided in, or engaged with, the vehicle;

a notification unit configured to output a notification through the at least one window in response to a result delivered from the determination unit; and a controller for limiting the notification according to a position of the window, wherein when a first condition for moving the vehicle and a second condition for detecting the driving mode except an autonomous driving state are satisfied, all windows except a window next to a driver's seat are activated, when the window is opened, the window corresponding to open state is inactivated, and when a battery charging state is below a predetermined range or level, all windows are inactivated.

14. The apparatus according to claim 13, wherein the driving mode monitoring unit determines the driving mode based on at least one of a speed of the vehicle, the autonomous driving state, a driving road condition, and a predetermined condition preset by the driver or the passenger, and wherein the determination unit allows the window to be used as the input/output module when the driving mode is the autonomous driving state.

15. The apparatus according to claim 13, wherein the controller is configured to:

when the window is adjacent to the driver's seat, allow the notification when the vehicle is not moving;

when the vehicle is moving, monitor whether the driving mode is the autonomous travelling state through the driving mode monitoring unit;

allow the notification in the autonomous driving state; and limit the notification when the driving mode is not in the autonomous driving state.

16. The apparatus according to claim 13, further including:

a battery management unit configured to monitor a charge state of a battery in the vehicle, wherein the notification unit limits the notification when the charging state of the battery falls within a predetermined range.

17. The apparatus according to claim 13,
wherein the notification includes at least one of a color and a pattern displayed on the window, and
wherein the notification is outputted respectively for each window mounted on the vehicle.

18. The apparatus according to claim 13, further including:
a receiver for receiving an input from the driver or the passenger at the window only through which the notification is outputted,
wherein the input includes at least one of a touch input and a breath input.

19. The apparatus according to claim 13, wherein the notification unit limits the notification in response to a door open state and a window open state of the vehicle.

20. The apparatus according to claim 13, further including a communication unit configured to:
engage the at least one of the computing device, the camera, and the multimedia device with an audio-video-navigation device provided in the vehicle; or
engage the at least one of the computing device, the camera, and the multimedia device with a mobile device coupled to a wireless communication unit in the vehicle,
wherein the communication unit is coupled to the audio-video-navigation device via a controller area network (CAN), while the communication unit is coupled to a mobile device through a short-range wireless communication method.

* * * * *